R. L. WOOD.
ATTACHMENT FOR STEERING MECHANISMS.
APPLICATION FILED OCT. 28, 1914.

1,167,240.

Patented Jan. 4, 1916.

WITNESSES

INVENTOR
Roy L. Wood
BY
ATTORNEYS

UNITED STATES PATENT OFFICE.

ROY L. WOOD, OF RUSSELL, KANSAS, ASSIGNOR TO WOOD BROTHERS, OF RUSSELL, KANSAS.

ATTACHMENT FOR STEERING MECHANISMS.

1,167,240.   Specification of Letters Patent.   Patented Jan. 4, 1916.

Application filed October 28, 1914. Serial No. 868,995.

*To all whom it may concern:*

Be it known that I, ROY L. WOOD, a citizen of the United States, and a resident of Russell, in the county of Russell and State of Kansas, have invented a new and Improved Attachment for Steering Mechanisms, of which the following is a full, clear, and exact description.

My invention relates to an attachment for steering mechanisms for vehicles of the self-propelling type; and has reference more particularly to means tending to maintain the steering mechanism in neutral position.

An object of the invention is to provide a simple, strong and inexpensive device which will not require any alteration in the steering mechanism of a self-propelled vehicle when applied thereto, and which contrivance can be easily and quickly attached to the steering mechanism.

Another object of the invention is to provide an attachment of the class described which will reduce the shocks on the steering wheel and which will automatically restore the steering mechanism to neutral position.

With the above and other objects in view, the nature of which will more fully appear as the description proceeds, the invention consists in the novel construction, combination and arrangement of parts as herein fully described, illustrated and claimed.

Figure 1:
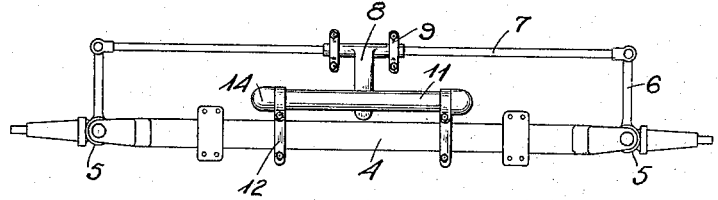
Figure 2:
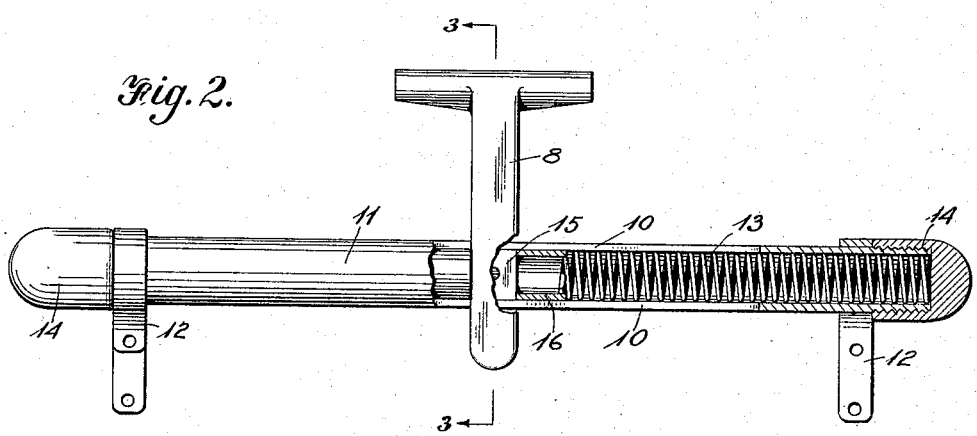
Figure 3:
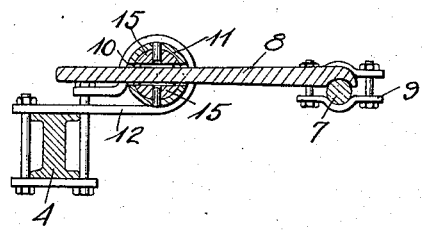

In the accompanying drawings, forming part of the application, similar characters of reference indicate corresponding parts in all the views, and Figure 1 is a plan view of a part of a steering mechanism of a self-propelled vehicle which is provided with an embodiment of my invention; Fig. 2 is a plan view of the attachment partly sectionalized to show the details of construction; and Fig. 3 is a cross section on line 3—3, Fig. 2.

Referring to the drawings, 4 represents the axle of an automobile provided with the customary steering knuckles 5, the arms 6 of which are interconnected by a tie-bar 7, the arm controlling the movement of the knuckles and the rods from the steering column not being shown.

Carried by the tie-bar 7 is a T-shaped arm 8, preferably secured thereto by means of clamps 9, substantially midway between the ends of the tie-bar. The part forming the shoulders of the bar is recessed at one face to conform to the shape of the bar, so as to provide a better grip between the arm and the bar. The main part of the arm 8 extends toward the axle, where it projects through longitudinal slots 10 provided in a tubular member 11 secured to the axle 4 by clamps 12 or any other suitable means. The tubular member 11 extends transversely of the T and is preferably central therewith when the steering mechanism is in neutral position. The slots 10 will permit a longitudinal and transverse movement of the arm 8 relative to the tubular member 11.

Positioned within the tubular member 11 on each side of the arm 8 is a coil spring 13, one end of which abuts against a cap 14 secured to the end of the tubular member. The other end of the coil spring abuts against a stop or stops 15 in alinement with the arm 8 and of the same width, so that the arm 8 can freely move transversely of the tubular member. The end of each spring, adjacent the stop 15, is preferably provided with a wearing member 16 which engages the stops 15.

As the steering knuckles 5 are actuated by the steering wheel of the steering mechanism the tie bar 7 moves relative to the axle 4 and therewith the arm 8 moves bodily longitudinally and transversely of the tubular member 11 which is stationary relative to said arm 8. According to the direction of movement of the tie-bar 7 the corresponding coil spring 13 will be compressed, the other spring remaining undisturbed by the engagement of its working end 16 with the stop. As the steering wheel is released, the engaged coil spring 13 will force the arm 8 to its normal position and therewith the tie-bar 7, consequently restoring the steering mechanism to its neutral position. This attachment will keep the vehicle in a straight direction in case the steering gear becomes broken or unmanageable, or when the steering gear is released by the driver of the vehicle. It will further serve as a shock absorber between the steering wheel and the road wheel, the springs 13 serving as buffers and eliminating all shocks from the steering wheel. It will make the driving easier, especially with the reversible type of steering gear, as the steering wheel need be grasped firmly only in making turns.

My attachment is a safeguard against accident, as it will prevent the vehicle from swerving one way or the other under the action of the surface of the road over which the vehicle is traveling when the steering mechanism is out of control.

From the foregoing description, taken in connection with the accompanying drawings, the advantage of the construction and operation of the device shown will be readily understood by those skilled in the art to which the invention pertains, and while I have described the principle of operation, together with the device which I now consider to be the best embodiment thereof, I desire to have it understood that the device shown is merely illustrative and that such changes may be made as are within the scope of the appended claims.

Having thus described my invention, I claim as new and desire to secure by Letters Patent:

1. The combination with a steering mechanism having a tie-bar, of an arm projecting laterally from said bar and adapted to participate in all the movements of said bar, a tubular member having longitudinal slots engaged by said arm, said tubular member being stationary, coil springs in said tubular member one on each side of said arm, and means in said tubular member normally preventing the engagement of said resilient members with said arm whereby said arm is free to move transversely of said tubular member but resisted in the longitudinal movement of said tubular member by said coil springs substantially as and for the purpose set forth.

2. In combination, a steering mechanism having a tie-bar, an anxle having steering knuckles connected to the tie-bar, a T-shaped arm carried by the tie-bar and adapted to participate in all the movements of the bar, a tubular member carried by the axle, said tubular member having longitudinal slots engaged by said arm, compression coil springs in said tubular member, one on each side of said arm, stops normally engaging the ends of the springs adjacent the arm and preventing the contact of said ends of the springs with said arm, and means for moving said tie-bar relative to said axle substantially as and for the purpose set forth.

In testimony whereof I have signed my name to this specification in the presence of two subscribing witnesses.

ROY L. WOOD.

Witnesses:
EDWIN W. VOORHIS,
MINNIE B. OLSON.

Copies of this patent may be obtained for five cents each, by addressing the "Commissioner of Patents, Washington, D. C."